Nov. 26, 1940.   V. C. HODGES   2,222,814

GEAR REDUCTION

Filed Dec. 7, 1939

INVENTOR.
Vera C. Hodges
BY Carlos G. Stratton
ATTORNEY.

Patented Nov. 26, 1940

2,222,814

UNITED STATES PATENT OFFICE 2,222,814

GEAR REDUCTION

Vera C. Hodges, Los Angeles, Calif.

Application December 7, 1939, Serial No. 307,938

5 Claims. (Cl. 74—301)

My invention relates to a gear reduction and has as its object the provision of a gear reduction unit that will require a minimum of space and yet produce a very substantial reduction.

Reference is made to my co-pending application Serial No. 307,937 filed contemporaneously herewith, for a clutch.

The invention also comprises novel details of construction and novel combinations and arrangements of parts, which will more fully appear in the course of the following description. However, the drawing merely shows and the following description merely describes an embodiment of the present invention, which is given by way of illustration or example only.

In the drawing, like reference characters designate similar parts in the several views.

Figure 1:
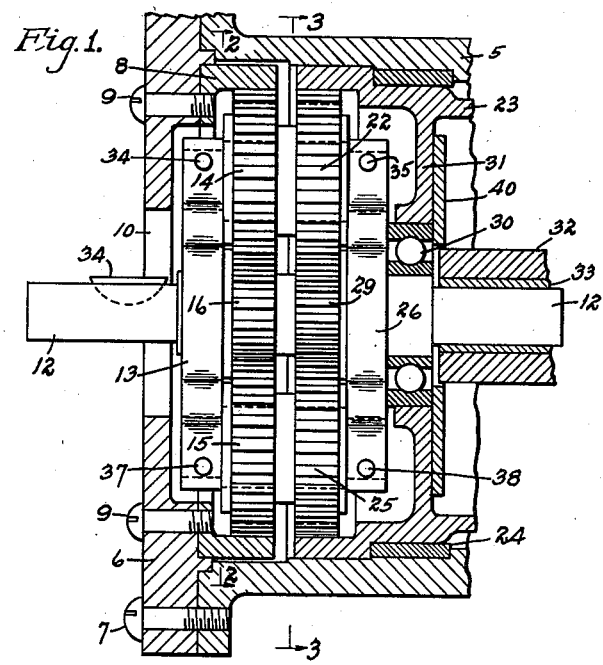
Figure 1 is a longitudinal section of an embodiment of my invention.
Figure 4:
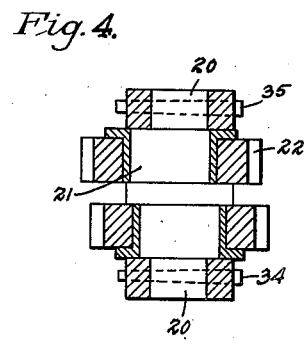
Figure 4 is a section taken on the line 4—4 of Figure 2, illustrating an offset shaft utilized in the embodiment.
Figure 2:
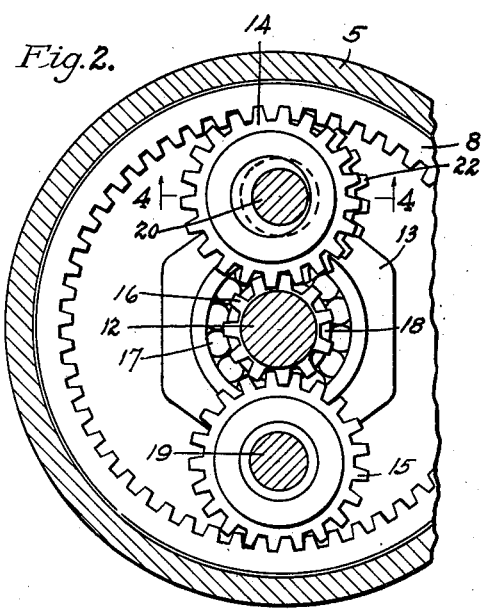
Figure 2 is a broken, transverse section taken on the line 2—2 of Figure 1.
Figure 3:
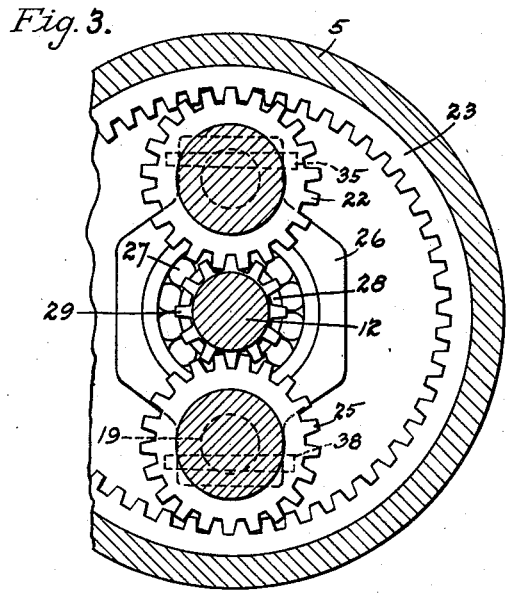
Figure 3 is a broken, transverse section taken on the line 3—3 of Figure 1.

Referring more in detail to the drawing, a housing 5 is provided for the embodiment. A head 6 is bolted to the housing, as suggested at 7. Bolted to the head 6, interiorly of the housing 5 is an internal ring gear 8. Bolts 9 secure the ring gear 8 to the head 6.

The head 6 has an opening 10 for a shaft 12. The shaft is concentric with the ring gear 8. A yoke 13 is mounted on the shaft 12 and carries pinion gears 14 and 15 which mesh with the ring gear 8 at substantially opposite points therein. A spur gear 16 is integral with the shaft 12 and meshes with each of the pinion gears 14 and 15. The yoke 13 provides a race for ball bearings 17. The inner ring of the race is shown at 18, which is mounted on the shaft 12. These bearings provide a substantially friction-free bearing for the shaft 12.

The pinion 15 is free to rotate on a shaft 19, while the pinion 14 is free to rotate on a shaft 20. The shaft 20 has an offset portion 21, upon which is rotatably carried a pinion gear 22.

An internal ring gear 23 is free to rotate within the housing 5. An annular bearing plate 24 is arranged in the housing 5 around a portion of the member 23. The spur gear 22 meshes with the gear 23, while a spur gear 25 on the shaft 19 also engages the teeth of the ring gear 23, at substantially an opposite point thereof. A yoke 26 together with the yoke 13 supports the shafts 19 and 20 upon the main shaft 12. As with the case of the yoke 13, the yoke 26 provides a race for ball bearings 27. The other annular member 28 of the race is mounted on the shaft 12.

A spur gear 29 is arranged on the shaft 12 in between and meshing with pinion gears 22 and 25. Ball bearings 30 are provided for the shaft 12 within an internal flange 31 of the element 23. A bearing 32 and bushing 33 are also arranged for an end of the shaft 12. A key 34 is shown at the opposite end of the shaft 12 for fastening driving means thereto. The driven element of the unit is the element 23, which is connected with a suitable power take-off.

Pins 34 and 35 fasten the shaft 20 to the yokes 13 and 26. Pins 37 and 38 fasten the shaft 19 on the yokes 13 and 26.

In the embodiment shown, the offset in the shaft 20 is sufficient to offset the spur gear 22 one-half (½) of one of its teeth. Also in the embodiment shown, the spur gear 29 has one more tooth than the spur gear 16, while the ring gears 8 and 23 have the same number of teeth. Moreover, in the embodiment shown, the pinion gears 14 and 22 have the same number of teeth and the spur gears 15 and 25 have the same number of teeth.

An annulus 40 maintains the rotary member 23 in position. The annulus 40 may be supported by the same member (not shown) that supports the bearing 32.

In the operation of the device, driving means is connected with the shaft 12 and fastened thereon by key 34 or other suitable means. Rotation of the shaft 12 causes rotation of all of the planetary gears 14, 15, 22 and 25 around the spur gears 12 and 29 respectively. The relatively fixed ring gear 8 causes independent rotation of the pinion gears 14 and 15 around their shafts 20 and 19, thus rotating the yoke 13 and through the shafts 19 and 20 rotating the yoke 26.

Rotation of the yoke 26 and of the spur gear 29 effects rotation of the ring gear 23 at a greatly reduced speed due to the single tooth difference between the spur gears 29 and 16. It is understood that the difference in the number of teeth between the spur gears 16 and 29 may vary otherwise than stated.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. Gear reduction means comprising relatively fixed and rotary ring gears, a shaft having spur gear means thereon, a pair of planetary gears engaging one of the spur gears at substantially opposite points on the periphery of the spur gear means, and the planetary gears engaging the fixed ring gear, a yoke floating around the shaft and maintaining the planetary gears in said positions, a second pair of planetary gears engaging the rotary ring gear and engaging the other spur gear at substantially opposite points on the periphery thereof, a yoke floating around the shaft and maintaining the latter planetary gears in their said positions, and a pair of shafts secured in connection with said yokes, each shaft supporting one of the planetary gears of each pair thereof, and one of said shafts having its gear supporting portions offset with respect to one another.

2. Gear reduction means comprising two elements having substantially identical ring gears, one ring gear being fixed and the other being rotary, substantially identical planetary gears engaging the ring gears, one planetary gear being approximately a half a tooth at the side of the other planetary gear, a single offset shaft for the two planetary gears, the offset being sufficient to arrange the one planetary gear a half a tooth at the side of the other, and different spur, driving gear means engaging the planetary gears.

3. Gear reduction means comprising two elements having substantially identical ring gears, one ring gear being fixed and the other being rotary, planetary gears engaging the ring gears, one planetary gear being approximately a half a tooth at the side of the other planetary gear, a single offset shaft for the two planetary gears, the offset being sufficient to arrange the one planetary gear a half a tooth at the side of the other, and spur gears respectively engaging the planetary gears, the gear ratio of one planetary gear to its engaged spur gear being different than the gear ratio of the other planetary gear to its engaged spur gear.

4. Gear reduction means comprising two elements having substantially identical ring gears, one ring gear being fixed and the other being rotary, substantially identical planetary gears engaging the ring gears, one planetary gear being approximately a half a tooth at the side of the other planetary gear, a single offset shaft for the two planetary gears, the offset being sufficient to arrange the one planetary gear a half a tooth at the side of the other, a main shaft, and spur gears on the shaft having different numbers of teeth and respectively engaging the planetary gears.

5. Gear reduction means comprising a shaft having different spur gears thereon, two elements having substantially identical ring gears, one ring gear being fixed and the other being rotary, substantially identical planetary gears engaging the fixed ring gear and disposed at substantially opposite points of one of the spur gears and in engagement therewith, a yoke floating around the shaft and maintaining the planetary gears in said positions, another set of planetary gears that are substantially identical with each other and substantially identical with the first-mentioned planetary gears, the second-mentioned set of planetary gears engaging the rotary ring gear and engaging the other spur gear at substantially opposite points thereon, a yoke floating around the shaft and maintaining the second-mentioned planetary gears in their said positions, a planetary gear of one set being axially offset with respect to the corresponding planetary gear of the other set, and means maintaining the sets of planetary gears in such position with the one gear of one set offset with respect to the corresponding gear of the other set.

VERA C. HODGES.